United States Patent [19]

Dilla et al.

[11] Patent Number: 5,445,741
[45] Date of Patent: Aug. 29, 1995

[54] PROCESS FOR TREATING WASTE WATER

[75] Inventors: Wolfgang Dilla; Helmut Dillenburg; Michael Klumpe; Hans-Georg Krebber; Horst Linke, all of Rheinberg; Detlef Orzol, Gladbeck; Erich Ploenissen, Rheinberg, all of Germany

[73] Assignee: Solvay Deutschland GmbH, Hanover, Germany

[21] Appl. No.: 172,207

[22] Filed: Dec. 23, 1993

[30] Foreign Application Priority Data

Dec. 30, 1992 [DE] Germany .................. 42 44 482.9

[51] Int. Cl.⁶ .................. C02F 1/76; C02F 1/78
[52] U.S. Cl. .................. 210/631; 210/663; 210/694; 210/754; 210/757; 210/759; 210/760; 210/908
[58] Field of Search .................. 210/754, 755, 756, 760, 210/694, 663, 670, 673, 631, 757, 908, 909, 759

[56] References Cited

U.S. PATENT DOCUMENTS

| | | |
|---|---|---|
| 3,767,572 | 10/1973 | Bober et al. . |
| 3,804,755 | 4/1974 | Cervantes . |
| 4,366,064 | 12/1982 | Mihelic et al. . |
| 4,758,346 | 7/1988 | Johnson .................. 210/638 |
| 4,804,478 | 2/1989 | Tamir .................. 210/752 |
| 4,836,929 | 6/1989 | Baumann et al. .................. 210/760 |
| 5,051,030 | 9/1991 | Saha et al. .................. 210/763 |
| 5,069,884 | 12/1991 | Filippone et al. .................. 210/754 |
| 5,075,015 | 12/1991 | Kamke .................. 210/754 |
| 5,120,452 | 6/1992 | Ness et al. .................. 210/754 |
| 5,302,288 | 4/1994 | Meidl et al. .................. 210/760 |

FOREIGN PATENT DOCUMENTS 1090926 12/1980 Canada .
2758220 7/1979 Germany .

*Primary Examiner*—Neil McCarthy
*Attorney, Agent, or Firm*—Evenson, McKeown, Edwards & Lenahan

[57] ABSTRACT

The present invention relates to a process for decreasing the content of organic-chemical substances in waste water by chemical oxidation, preferably in the presence of chlorine, and optionally additional alkaline thermal treatment of the waste water, in which the waste water, which has a COD content (chemical oxygen demand) and is alkaline or is rendered alkaline, is introduced into at least one reactor and is treated at a temperature of more than 15° C. with a chlorine-containing and/or chlorine-releasing chemical substance, the introduction of chlorine taking place in a quantity of more than 1 g chlorine/g COD (relative to the chlorine content of the chlorine-containing and/or chlorine-releasing chemical substance), and a molar ratio of $OH^-$ to chlorine of more than 1.5 and a pH value of the waste water of $\geq 5$ being maintained or set, and the resulting chlorine-treated, hypochlorite-containing waste water is subjected to a reaction time of more than 0.25 hours, with the organic compounds being at least partially oxidized, and subsequently the waste water is treated further and/or is discharged or drained from the reactor.

37 Claims, No Drawings

PROCESS FOR TREATING WASTE WATER

BACKGROUND OF THE INVENTION

The present invention relates to a process for decreasing the content of organic-chemical substances in waste water by chemical oxidation, preferably in the presence of chlorine, and optionally additional alkaline thermal treatment of the waste water, and also to the use of the process for the treatment of waste water.

It is already known to subject waste water containing undesirable, dissolved or dispersed organic substances to oxidative chemical-thermal treatment, in which the organic substances are oxidized to carbon dioxide and water. Such a process is described, for example, in published German Patent Application No. DE 26 40 603, and is generally known under the name "wet oxidation".

The wet oxidation process is characterized by oxidation in the liquid phase. In order to achieve satisfactory degradation of the organic compounds and sufficient reaction rates, a certain oxygen concentration and high temperatures and pressures are required. This treatment method is therefore very expensive owing to its high energy consumption and the costly apparatus. Although the temperatures and pressures used may be reduced by using heavy-metal catalysts, this leads to subsequent contamination of the waste water with the catalytically active substances, which may make additional treatment steps necessary.

The contamination of bodies of water with organic substances is characterized by a number of physical-chemical parameters. These include the "chemical oxygen demand" (COD) as a measurement of the oxygen consumption upon chemical wet oxidation of the organic compounds dissolved or dispersed in a body of the water under defined conditions. The content of chemically oxidizable substances in waste water can thus be calculated by means of this parameter.

It is known from Japanese Patent Application 49/021951 (reviewed in Chemical Abstracts CA81(10): 54117j) to subject water containing organic substances to treatment with UV light and with active chlorine or hypochlorite, followed by subsequent treatment with activated carbon, in order to reduce the COD value. However, the use of UV light in the treatment of water is technically complex and expensive.

A process for decreasing pollutants producing COD and AOX in waste waters from bleaching plants from pulp production is known from DE-OS 36 20 980. The AOX is a further summation parameter for characterizing organic contamination in bodies of water. It stands for "adsorbable organic halogen compounds", and is determined as the portion of organic halogen compounds (X=Cl, Br, I) which can be adsorbed on activated carbon, with the total quantity adsorbed being converted to X=Cl.

The process of published German Patent Application No. DE 36 20 980 is preferably performed in three stages, with the strongly acidic solution from chlorine bleaching in the first stage having calcium ions added to precipitate chlorine compounds and hence to reduce the COD and the AOX. In a second stage, an additional AOX reduction takes place by means of thermal alkaline hydrolysis, which leads to partial de-chlorination of the non-precipitated adsorbable organic chlorine compounds. The pollutants producing COD and AOX which are still contained in the waste water after this process step are subjected to microbial degradation in a third stage.

Even this process for decreasing organic pollutants in waste water is very costly, and hence is unsatisfactory from the economic point of view.

SUMMARY OF THE INVENTION

It is an object of the present invention to provide a process with which organic compounds, which are produced in particular in large-scale processes or synthesis operations and often cause considerable contamination with COD and, in the case of halo-organic compounds, also with AOX, of bodies of water, can be degraded at low technical and financial cost.

Another object of the invention is to provide a process which enables successful treatment of waste water which may contain as organic substances non-halogenated and optionally also halogenated organic compounds, so that it is possible to optionally achieve a reduction in the AOX content of the waste water to be treated in addition to a primary COD reduction.

A further object of the invention is to provide a process which can be used to process any type of waste water, independently of their respective COD and optionally also AOX content, and which leads to an effective and substantial reduction in the COD and optionally also AOX values.

These and other objects of the invention are achieved by providing a process for decreasing the content of organic substances in waste water by chemical oxidation comprising treating alkaline waste water which has a COD content in a reaction vessel at a temperature of more than 15° C. for a period of at least 0.25 hours, preferably 0.4 hours, with a sufficient amount of a chlorine-releasing substance to release at least 1 g of chlorine per g COD initially contained in the water and in the presence of a molar ratio of $OH^-$ to chlorine of more than 1.5 and maintaining a pH value of $\geq 5$, preferably $\geq 6$, whereby hypochlorite forms in the waste water and organic compounds initially present in the water are at least partially oxidized.

DETAILED DESCRIPTION OF PREFERRED EMBODIMENTS

In accordance with the present invention, a process of the type described above is proposed in which waste water, which has a COD content (chemical oxygen demand) and is alkaline or is rendered alkaline, is introduced into at least one reactor and is treated at a temperature of more than 15° C. with a chlorine-containing and/or chlorine-releasing chemical substance, the introduction of chlorine taking place in a quantity of more than 1 g chlorine per g COD (relative to the chlorine content of the chlorine-containing and/or chlorine-releasing chemical substance), and a molar ratio of $OH^-$ to chlorine of more than 1.5 and a pH value of the waste water of $\geq 5$, preferably $\geq 6$, being maintained or set, that the chlorine-treated, hypochlorite-containing waste water is subjected to a reaction time of more than 0.25 hours, preferably 0.4 hours, with the organic compounds being at least partially oxidized, and that subsequently the waste water is treated further and/or is discharged or drained from the reactor.

With this process, it is possible in an economic and technically simple manner to reduce the COD content of waste water by more than 90%. If the waste water additionally contains AOX-producing organic substances, the AOX content of the waste water is likewise reduced by the process according to the invention.

It has been discovered that using the process according to the invention the COD content and optionally also AOX content (if halo-organic compounds are present in the waste water) of both municipal and in particular industrial waste water can be effectively reduced.

With the process according to the invention, in particular also those waste waters which have already been subjected to preliminary cleaning, for instance by other oxidative and other chemical-physical, chemical, physical and/or biological processes, can be treated. Preferably waste waters which have been subjected to pretreatment by a thermal alkaline, an adsorptive and/or a microbiological process are treated using the process according to the invention. However, the waste water may also have been preliminarily cleaned by a precipitation treatment.

The introduction of chlorine (in the form of a chlorine-containing and/or chlorine-releasing chemical substance) in accordance with the process of the invention into an alkaline aqueous solution, such as is produced, for example, in the process streams of an allyl chloride/epichlorohydrin/glycerol installation, brings about disproportionation of the chlorine into chloride and hypochlorite in accordance with equation 1:

$$Cl_2 + OH^- \rightarrow Cl^- + HOCl \qquad \text{(equation 1)}$$

The oxidizing action of the hypochlorite is utilized to oxidize the organic contents (in the case of the aforementioned waste lye from an allyl chloride/epichlorohydrin/glycerol installation: preferably glycerol, glyceric acid, lactic acid, glycidol) of an alkaline-acting waste water to $CO_2$ and water. The resulting $CO_2$, and also possible gaseous intermediate products of oxidation, may be expelled in a pressure-less process.

It has been discovered according to the invention that for the COD degradation (and optionally also AOX degradation) according to the process discovered certain parameters with strictly defined limiting values must absolutely be maintained. First, accurate metering of chlorine dependent on the organic load (COD-producing contents of the waste water) is necessary in order to ensure the lowest possible concentrations of hypochlorite and chlorate (the latter forms as an undesirable byproduct in the presence of excess chlorine) in the waste water. For the same reason, a very definite chlorine/alkalinity ratio must be maintained or set. In this case, it is desirable to have a molar ratio of $OH^-$ to chlorine of 1.6 to 3.5, preferably 1.6 to 3, particularly preferably 2 to 2.5, and especially preferably 2 to 2.2, in which case the hydroxide ion may be present in the waste water as a free hydrated ion (i.e. in dissolved form) or chemically bound. In the latter case, continual subsequent dissolving of the bonded hydroxide ions must be ensured corresponding to the chlorine/alkalinity ratio which is to be maintained. Preferably solid, dissolved and/or suspended alkali and/or alkaline-earth hydroxides and/or oxides may be contained in the waste water and/or be added thereto as compounds which release or form hydroxide ions. In particular, an aqueous solution or suspension containing calcium hydroxide, preferably milk of lime, is used. The aforementioned alkaline-acting substances are preferably also used to set or maintain the pH values according to the invention (measured at room temperature each time).

Furthermore, it has been found that it is necessary to monitor the pH of the oxidation of organic compounds by means of chlorine which is performed according to the invention. The introduction of chlorine into an alkaline aqueous solution leads to a lowering of the pH value, the reduction in pH being dependent on the quantity of chlorine introduced. At lower pH values, in particular in the more strongly acidic pH range, an undesirable increase in AOX in the waste water occurs. It has been found according to the invention that the aforementioned disadvantages can be avoided if a pH value of the waste water of $\geq 5$, preferably $\geq 6$, is maintained. In particular, it has proved beneficial to maintain or set a pH value of $\geq 10$ during the introduction of chlorine into the waste water. At the end of the reaction time which is to be kept to according to the invention, a pH value of about 9 then occurs in the treated waste water.

It has furthermore been established according to the invention that an increase in the oxidation rate is achieved with increasing temperature, which leads to a shortening of the dwell times or reaction times after the introduction of chlorine and increases the rate of the degradation of COD. In particular, it was discovered to treat the waste water at a temperature of 40° to 140° C., preferably 40° to 100° C., especially preferably 80° to 95° C., with a chlorine-containing and/or chlorine-releasing chemical substance.

The introduction of chlorine is preferably carried out with the treatment reactor being set or maintained at standard pressure. This has advantages in terms of apparatus and economy. However, a reaction may also be carried out under elevated pressure, in which case an advantageously significant decrease in the AOX was found.

If the process according to the invention is carried out without pressure, the $CO_2$ which is formed in the meantime can simply be removed or drained from the treatment reactor. This likewise applies to gaseously-formed intermediate products of the oxidative treatment of the organic contents of the waste water. In the process variant under elevated pressure, it has been found that in treating waste water from an allyl chloride/epichlorohydrin/glycerol installation, the gaseous intermediate products of the oxidative degradation of the organic contents of the waste water formed upon the chlorine treatment are kept in the reactor and are further oxidized to $CO_2$ by the hypochlorite while maintaining the reaction time according to the invention.

Furthermore, it has been found according to the invention that particularly good results are achieved by introducing chlorine (relative to the chlorine content of the chlorine-containing and/or chlorine-releasing chemical substance) in an amount of 2 to 10 g, preferably 2 to 8 g, chlorine per g COD, particularly preferably 4 to 8 g, and especially preferably 5 to 6 g chlorine per g COD.

In order to substantially avoid formation of undesirable byproducts during the oxidation according to the invention, the previously-described, accurately-defined quantity of activated chlorine in the waste water must be produced or provided in the simplest and most effective way possible. This may be done by adding "free effective chlorine" in the form of dissolved elemental chlorine, hypochlorous acid and/or hypochlorite. However, the oxidation agent may also be made available as "bonded effective chlorine" in the form of oxidizing chlorine-substituted compounds or other chlorine-releasing substances, such as chloramine-T. Furthermore, chloride-containing water from which chlorine is released electrochemically may also be used. Preferably a chlorine-containing gas, in particular chlorine gas, is used in the process according to the invention as the chlorine-containing chemical substance.

In order to improve the kinetic conditions of chlorination of the waste water and to avoid the formation of considerable localized fluctuations in chlorine concentration and the localized severe drops in pH which these involve, the introduction of chlorine should be as fine as possible, and it is advantageous to use dilute chlorine gas, preferably gaseous chlorine mixed with an inert gas such as nitrogen, as the chlorine-containing gas.

The introduction of the chlorine-containing gas is advantageously carried out using an overpressure of 0.1 to 7 bar, preferably 0.1 to 5 bar, particularly preferably 0.2 to 6 bar and especially preferably 0.2 to 3 bar.

The process according to the invention can be further improved in that during and/or after the treatment of the waste water with the chlorine-containing and/or chlorine-releasing chemical substance a pH value (measured at room temperature) of the waste water of 10 to 14, preferably 11 to 13, is maintained or set, and that the chlorine-treated, hypochlorite-containing waste water is subjected to a reaction time of 0.25 to 8 hours, preferably 0.5 to 8 hours, particularly preferably 1 to 5 hours, and especially preferably 3 to 5 hours, at a temperature of 65° to 200° C., preferably 80° to 135° C.

This means that once again an increase in the degradation of COD and in particular also in the degradation of AOX can be achieved.

A further improvement in the degradation rates is obtained by setting or maintaining certain pressure conditions in the reactor. Preferably during the reaction time a pressure in the reactor of 1 to 11 bar (absolute), preferably 1.1 to 7 bar, especially 1.1 to 4 bar (absolute) is maintained or set.

The treatment under excess pressure has proved particularly advantageous. If for instance a pH value of $\geq 10$, a temperature of approximately 130° C. and a pressure of approximately 2.5 bar (absolute) are maintained over a reaction period of 60 to 90 minutes, it is possible to observe a COD degradation of more than 92% and an AOX reduction of more than 80%.

The process according to the invention may be performed continuously or batch-wise. Reaction columns or tubular reactors may be used as treatment vessels or reactors. The addition of the chlorine-containing and/or chlorine-releasing substance to the waste water may for instance take place in a flow tube, the length of the flow tube and/or the rate of flow of the waste water being calculated such that the reaction time or dwell time according to the invention of the waste water in the treatment apparatus is maintained. The use of a plurality of reactors connected in series or in parallel is also possible in order to perform the process according to the invention.

Furthermore, the reactor or reactors may contain internal fittings for thoroughly mixing the waste water to be treated.

In order to avoid clogging in the treatment apparatus due to settling solids, which may be present in the waste water or may be formed during the oxidative treatment, it may be advantageous at least partly to free the waste water of suspended solids, preferably by chemical reaction and/or mechanical separation processes, such as filtration and/or sedimentation, before, during and/or after the treatment.

In order to reduce further the COD content of the waste water and optionally any AOX content which may be present, subsequently further treatment of the waste water which has undergone oxidative and thermal-alkaline treatment may be carried out.

In this case, a combination of the oxidative, thermal-alkaline treatment process according to the invention and a subsequent ozone treatment has proved advantageous. The high oxidizing power of the ozone has long been used in the treatment of waste water in order to degrade organic contents of the waste water by oxidation, in which case certain exposure times and ozone concentrations have to be maintained.

The ozone treatment provided according to the invention is preferably carried out as follows: an ozone-containing gas is mixed with the waste water which has undergone oxidative and thermal-alkaline treatment, with a pH value $\geq 10$ (measured at room temperature), preferably $\geq 11$, being maintained or set in the waste water and the introduction of ozone taking place in an amount of 1 to 4 g ozone/g COD, preferably 2 to 2.5 g ozone/g COD.

The adjusting of the pH value which may possibly be necessary may be performed using conventional alkaline-acting media. In particular, the alkaline-acting substances already intended for the oxidative and thermal-alkaline treatment process according to the invention may be used.

The ozonization of the waste water is performed in particular at room temperature, in which case optionally cooling of waste water heated during the preceding treatment has to take place. However, the ozone treatment may also take place at elevated temperature.

If it is equipped appropriately, the ozonization may be carried out in the treatment reactor already used. Preferably, however, the already-treated waste water is introduced or passed into an additional reactor and/or a special apparatus for ozone treatment. Commercially available ozonization apparatus, which comprise at least an ozone generator, a treatment reactor made of an inert material with internal fittings for thoroughly mixing the waste water, and an injector for introducing the ozone into the waste water, are used for this purpose. The $CO_2$ formed during the ozonization is removed or expelled from the treatment reactor, optionally using special means.

The ozone treatment may be carried out in one or more stages. In order to increase the efficiency of degradation, furthermore irradiation with UV light may be carried out during ozonization.

The use of ozone in combination with the oxidative and thermal-alkaline process according to the invention leads to a further advantageous reduction of COD-producing and optionally AOX-producing constituents in the waste water to be treated.

Instead of the ozone treatment, the further treatment of the waste water may also take place by oxidative and/or adsorptive treatment, in which case the further treatment is preferably carried out using hydrogen peroxide and/or activated carbon.

Preferably regeneration of the activated carbon, preferably by thermal treatment using aqueous alkalis, is carried out following the activated carbon treatment.

The waste water may also be further treated by means of a catalytic treatment in the presence of hydrogen. The catalyst used for this treatment is preferably a noble metal catalyst.

Furthermore, the process according to the invention may be combined with pre-treatment of the waste water, in order, for example, to remove pollutants other than organic ones from the waste water, or in order to carry out a degradation of COD, AOX, TOC. and/or BSB already in a preliminary cleaning stage, so that the subsequent treatment according to the process of the invention can be carried out under milder conditions and/or with a lower use of chemicals.

The pre-treatment preferably takes place by a thermal alkaline, an adsorptive and/or a microbiological process. The thermal alkaline pre-treatment is carried out while maintaining and/or setting certain defined pH values, temperatures, pressure and residence times. For example, an activated carbon treatment is proposed as an adsorptive process. The microbiological preliminary cleaning operation may be carried out using anaerobic or aerobic bacteria.

The waste water treatment process according to the invention may be used to degrade COD-producing and (if present) AOX-producing constituents in any waste water. One special industrial field in which the process devised can preferably be used is in the treatment of waste water from the production of halohydrins, polyols and/or vinyl chloride. For such waste waters in particular, a purification process should be provided which does not require a lot of technical resources and is inexpensive to carry out.

Particularly preferably, waste water from the production of glycerol and/or polyglycerol, and furthermore from the production of chlorohydrin, preferably from the synthesis of epichlorohydrin, may be purified using the process according to the invention, the epichlorohydrin being obtained by reacting a solution containing dichloropropanol with at least one alkaline compound, preferably an aqueous suspension containing calcium hydroxide, with an excess of calcium hydroxide relative to the dichloropropanol used.

Likewise, the process according to the invention is highly suitable for treating mixed waste water from the production of halohydrins, polyols and/or vinyl chloride, that is, for the treatment of waste water produced by mixing the aforementioned waste waters from the production of halohydrins, polyols and/or vinyl chloride.

Furthermore, it has been found that COD-producing constituents in waste water, such as in particular saturated and/or unsaturated aliphatic and/or alicyclic hydrocarbons, ethers, alcohols, preferably also polyols, ketones, aldehydes and/or carboxylic acids, are degraded very well by the process according to the invention.

This also applies to constituents which additionally produce AOX values, such as in particular saturated and/or unsaturated aliphatic and/or alicyclic chlorohydrocarbons, chloroethers, chloroalcohols, chloroketones, chloroaldehydes, chlorohydrins and/or chlorocarboxylic acids.

Furthermore, the process according to the invention is preferably used for the treatment of waste water which is produced upon the use and/or reaction of halohydrins, for instance in the production of epoxy resins from halohydrins, and/or polyols.

The following non-limiting examples are intended to illustrate the process of the invention in further detail without restricting its scope.

EXAMPLES

Example 1

1000 ml waste water from an installation for producing allyl chloride/epichlorohydrin/glycerol were transferred into a reaction vessel, and 7 g chlorine were introduced into the waste water at 95° C. within 25 minutes. The pH value thereby dropped to 6.8. Once the introduction of chlorine had ended, the solution was stirred for another 90 minutes at 95° C., and was then drained from the reactor.

The following evaluation parameters were determined for the incoming (untreated) and the outgoing (treated) waste water.

| Analysis data of the incoming waste water: | Analysis data of the outgoing waste water: |
| --- | --- |
| pH = 12.1 | pH = 6.5 |
| COD = 890 mg/l | COD = 27 mg/l |
| AOX = 26.3 mg/l | AOX = 5 mg/l |
| DOC = 303 mg/l | DOC = 16.4 mg/l |
| $OH^-$ = 0.185 mole/l | |
| $Cl^-$ = 20.4 g/l | $Cl^-$ = 25.0 g/l |

Example 2

1000 ml waste water from an installation for producing allyl chloride/epichlorohydrin/glycerol were mixed with 100 ml of a waste water containing vinyl chloride and were transferred into a reaction vessel. The solution was heated to 85° C., and 7 g chlorine were introduced within 20 minutes. The pH value thereby dropped to 6.3 to 6.4. Once the addition of chlorine had ended, the solution was stirred fully for another 90 minutes at 95° C., and was then drained from the reactor.

The following evaluation parameters were determined for the incoming (untreated) and the outgoing (treated) waste water.

| Analysis data of the incoming waste water: | Analysis data of the outgoing waste water: |
| --- | --- |
| pH = 11.8 | pH = 6.3 |
| COD = 935 mg/l | COD = 48 mg/l |
| AOX = 23.8 mg/l | AOX = 14.8 mg/l |
| DOC = 358 mg/l | DOC = 23.8 mg/l |
| $OH^-$ = 0.169 mole/l | |
| $Cl^-$ = 22.4 g/l | $Cl^-$ = 25.9 g/l |

Example 3

Following the procedure described in Example 2, a mixture of 1000 ml waste water from an installation for producing allyl chloride/epichlorohydrin/glycerol and 100 ml waste water containing vinyl chloride was produced and introduced into a reaction vessel. 4.6 g chlorine were introduced into the mixed waste water at 95° C. within 25 minutes. The pH value thereby dropped to 10.3. Then the mixed waste water was transferred into an autoclave, and was stirred for 1 hour at 130° C. and 2.6 bar (absolute). Then the waste water was drained from the reactor.

The following evaluation parameters were determined for the incoming (untreated) and the outgoing (treated) waste water.

| Analysis data of the incoming waste water: | Analysis data of the outgoing waste water: |
|---|---|
| pH = 11.8 | pH = 10.2 |
| COD = 935  mg/l | COD = 78  mg/l |
| AOX = 23.8  mg/l | AOX = 2.2  mg/l |
| DOC = 358  mg/l | DOC = 39.5  mg/l |
| OH⁻ = 0.169  mole/l | |
| Cl⁻ = 22.4  g/l | Cl⁻ = 25.6  g/l |

Example 4

1000 ml of waste water from an installation for producing allyl chloride/epichlorohydrin/glycerol were transferred to a reaction vessel, and 5.1 g chlorine were introduced into the waste water at 97° C. over the course of 37 minutes. Once the addition of chlorine had ended, the solution was transferred into an autoclave and kept for 1 hour at 130° C. and 2.5 bar (absolute). Then the waste water was drained from the reactor.

The following evaluation parameters were determined for the incoming (untreated) and the outgoing (treated) waste water.

| Analysis data of the incoming waste water: | Analysis data of the outgoing waste water: |
|---|---|
| pH = 12.1 | pH = 6.2 |
| COD = 890  mg/l | COD = 19  mg/l |
| AOX = 26.3  mg/l | AOX = 7.8  mg/l |
| DOC = 303  mg/l | DOC = 9.3  mg/l |
| OH⁻ = 0.185  mole/l | |
| Cl⁻ = 20.4  g/l | Cl⁻ = 23.9  g/l |

Example 5

1000 ml of waste water from an installation for producing allyl chloride/epichlorohydrin/glycerin having a pH of 12 (measured at room temperature) were subjected to a thermal treatment in accordance with the invention at a temperature of 130° C. and a residence time of 4 hours. Subsequently, this water was treated with 7 g of chlorine/g COD at a temperature of 130° C. and a residence time of 3 hours.

The following evaluation parameters were determined for the untreated water and for the treated water:

| Analysis data of the incoming waste water: | Analysis data of the outgoing waste water: |
|---|---|
| COD = 1116  mg O₂/l | COD = 58  mg O₂/l |
| AOX = 36  mg Cl/l | AOX = 2  mg Cl/l |
| DOC = 400  mg C/l | DOC = 32  mg C/l |

Example 6

1000 ml of waste water from an installation for producing allyl chloride/epichlorohydrin/glycerin having a pH of 12 (measured at room temperature) were treated with 7 g chlorine/g COD at 130° C. and a residence time of 3 hours.

The following evaluation parameters were determined for the untreated water and for the treated water:

| Analysis data of the incoming waste water: | Analysis data of the outgoing waste water: |
|---|---|
| COD = 1116  mg O₂/l | COD = 67  mg O₂/l |
| AOX = 36  mg Cl/l | AOX = 3  mg Cl/l |
| DOC = 400  mg C/l | DOC = 61  mg C/l |

Example 7

Waste water from an installation for producing allyl chloride/epichlorohydrin/glycerin was treated in a technical installation in continuous operation under the following conditions in accordance with the invention:

| | |
|---|---|
| Temperature of the incoming waste water: | 93–97° C. |
| Volume of the incoming stream: | 0.6 m³/hour |
| Alkalinity in the incoming water: | 350–500 mval OH⁻/l |
| pH value (measured at 25° C.): | >11 |
| Mass flow of chlorine: | 4.3–4.5 kg/hour |
| Pressure in the reaction system: | 2.55 bar |
| Temperature in the reaction system: | 125° C. |
| Residence time in the reaction system: | 2 hours |
| pH value (measured at 25° C.) in discharge: | 11 |

The following evaluation parameters were determined for the incoming (untreated) and the outgoing (treated) waste water:

| Analysis data of the incoming waste water: | Analysis data of the outgoing waste water: |
|---|---|
| COD = 833  mg O₂/l | COD = 36  mg O₂/l |
| AOX = 13  mg Cl/l | AOX = 2  mg Cl/l |
| DOC = 286  mg C/l | DOC = 8  mg C/l |

Example 8

Waste water was treated following a procedure analogous to the procedure of Example 7.

The following evaluation parameters were determined for the incoming (untreated) and the outgoing (treated) waste water:

| Analysis data of the incoming waste water: | Analysis data of the outgoing waste water: |
|---|---|
| COD = 1023  mg O₂/l | COD = 75  mg O₂/l |
| AOX = 14  mg Cl/l | AOX = 3  mg Cl/l |
| DOC = 433  mg C/l | DOC = 15  mg C/l |

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for decreasing the content of organic substances in alkaline waste water from the production of a substance selected from the group consisting of halohydrins, polyols and vinyl chloride, said waste water having a COD content, by chemical oxidation comprising the steps of:

treating the waste water in a reaction vessel at a temperature of more than 15° C. for a period of at least 0.25 hours with a sufficient amount of a chlorine-releasing substance to release at least 1 g of chlorine per g COD initially contained in the water and in the presence of a molar ratio of OH$^-$ to chlorine of more than 1.5 and maintaining a pH value of $\geq 5$, whereby hypochlorite forms in said waste water and organic compounds initially present in the water are at least partially oxidized, and subjecting the waste water to a thermal treatment under alkaline conditions at a temperature of 65° to 200° C. for a period of from 0.25 to 8 hours, whereby the thermal treatment may either precede or follow the treatment with the chlorine-releasing substance; and thereafter subjecting the water to at least one further treatment selected from the group consisting of oxidative treatment with ozone or hydrogen peroxide, adsorptive treatment with activated carbon, and catalytic treatment with hydrogen in the presence of a noble metal catalyst.

2. A process according to claim 1, wherein said oxidation is carried out in the presence of chlorine.

3. A process according to claim 1, further comprising adjusting the waste water to a pH $\geq 6$ prior to the treatment with the chlorine-releasing substance.

4. A process according to claim 1, wherein the treatment with the chlorine-releasing substance is carried out at a temperature in the range from 40° to 140° C.

5. A process according to claim 4, wherein the treatment with the chlorine-releasing substance is carried out at a temperature in the range from 40° to 100° C.

6. A process according to claim 1, wherein said chlorine-releasing substance contains from 2 to 10 g of chlorine per g of COD initially present in the water.

7. A process according to claim 1, wherein said chlorine-releasing substance contains from 2 to 8 g of chlorine per g of COD initially present in the water.

8. A process according to claim 1, wherein the treatment with the chlorine-releasing substance is carried out at atmospheric pressure.

9. A process according to claim 1, wherein the treatment with the chlorine-releasing substance is carried out in a reactor at a pressure above atmospheric pressure.

10. A process according to claim 1, wherein the treatment with the chlorine-releasing substance is carried out in the presence of a molar ratio of OH$^-$ to chlorine of 1.6 to 3.5.

11. A process according to claim 10, wherein the treatment with the chlorine-releasing substance is carried out in the presence of a molar ratio of OH$^-$ to chlorine of 1.6 to 2.5.

12. A process according to claim 1, wherein said chlorine-releasing substance is a chlorine-containing gas.

13. A process according to claim 12, wherein said chlorine-containing gas is chlorine gas.

14. A process according to claim 12, wherein the chlorine-containing gas is introduced into the reaction vessel at an overpressure of 0.1 to 7 bar.

15. A process according to claim 14, wherein the chlorine-containing gas is introduced into the reaction vessel at an overpressure of 0.1 to 5 bar.

16. A process according to claim 1, wherein said water has a pH of from 10 to 14.

17. A process according to claim 16, wherein said water has a pH of from 11 to 13, and said thermal treatment comprises treating the waste water at a temperature of 80° to 135° C. for a period of from 3 to 5 hours.

18. A process according to claim 1, wherein said thermal treatment is carried out at a pressure of 1 to 11 bar (absolute).

19. A process according to claim 18, wherein said thermal treatment is carried out at a pressure of 1.1 to 7 bar (absolute).

20. A process according to claim 1 further comprising adjusting the water to a pH of at least 10 after the treatment with the chlorine-releasing substance and thereafter subjecting the water to the thermal treatment.

21. A process according to claim 20, wherein said adjusting step is carried out by adding to the water an alkaline substance selected from the group consisting of alkali metal hydroxides, alkaline earth metal hydroxides, alkali metal oxides, alkaline earth metal oxides, and mixtures thereof.

22. A process according to claim 21, wherein said alkaline substance is an aqueous solution or suspension of calcium hydroxide.

23. A process according to claim 1, further comprising separating suspended solids from said waste water.

24. A process according to claim 1, wherein said further treatment comprises subjecting the water at a pH value of $\geq 10$ to treatment with an amount of an ozone-containing gas sufficient to introduce from 1 to 4 g of ozone into the water per g of COD initially present in the water.

25. A process according to claim 24, wherein said water is subjected at a pH value $\geq 11$ to treatment with an amount of ozone-containing gas sufficient to introduce from 2 to 2.5 g of ozone into the water per g of COD initially present in the water.

26. A process according to claim 24, wherein the water is transferred from said reaction vessel to a separate ozone treatment reactor prior to said treatment with ozone-containing gas.

27. A process according to claim 1, wherein said further treatment comprises an oxidative treatment with hydrogen peroxide.

28. A process according to claim 1, wherein said further treatment comprises an adsorptive treatment with activated carbon.

29. A process according to claim 28, further comprising the additional step of regenerating used activated carbon from said adsorptive treatment by thermal treatment with aqueous alkali.

30. A process according to claim 1, further comprising prior to the treatment with the chlorine-releasing substance and the thermal treatment the step of pretreating said waste water with at least one pretreatment selected from the group consisting of adsorptive treatments, and microbiological water purification treatments.

31. A process according to claim 1, wherein said water is waste water from the production of a substance selected from the group consisting of glycerol and polyglycerols.

32. A process according to claim 1, wherein said water is waste water from the synthesis of epichlorohydrin by reacting a solution containing dichloropropanol with an aqueous suspension containing a stoichiometric excess of calcium hydroxide relative to the dichloropropanol used.

33. A process according to claim 1, wherein said waste water contains at least one organic substance selected from the group consisting of saturated aliphatic hydrocarbons, unsaturated aliphatic hydrocarbons, saturated alicyclic hydrocarbons, unsaturated alicyclic hydrocarbons, ethers, alcohols, polyols, ketones, aldehydes, and carboxylic acids.

34. A process according to claim 1, wherein said waste water contains at least one chlorinated organic substance selected from the group consisting of saturated aliphatic chlorohydrocarbons, unsaturated aliphatic chlorohydrocarbons, saturated alicyclic chlorohydrocarbons, unsaturated alicyclic chlorohydrocarbons, chloroethers, chloroalcohols, chloroketones, chloroaldehydes, chlorohydrins and chlorocarboxylic acids.

35. A process according to claim 1, wherein said water is waste water from the reaction of halohydrins or polyols in an aqueous medium.

36. A process according to claim 1, wherein said further treatment comprises a catalytic treatment in the presence of hydrogen.

37. A process according to claim 1, wherein the thermal treatment precedes the treatment with the chlorine-releasing substance.

* * * * *